J. T. ROBIN.
TREATMENT OF FABRICS FOR GAS MANTLES.
APPLICATION FILED JUNE 14, 1921.
1,436,359.
Patented Nov. 21, 1922.
3 SHEETS—SHEET 1.
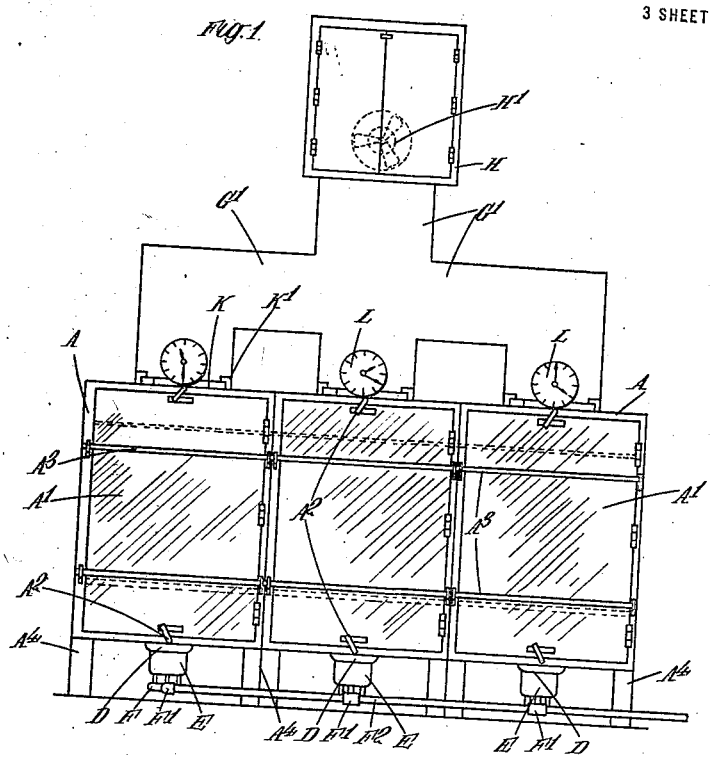
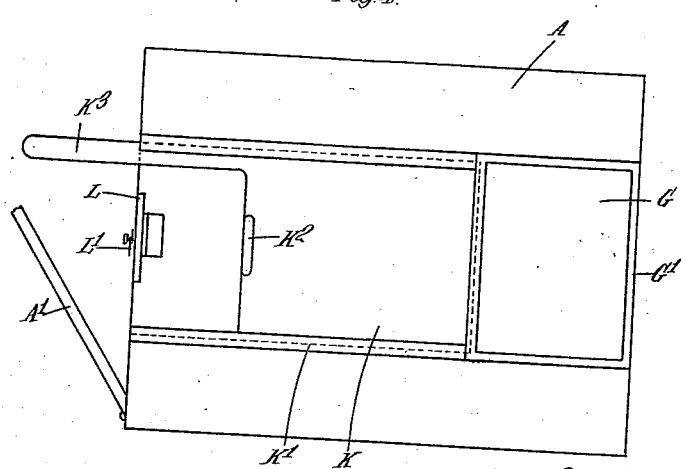

J. T. ROBIN.
TREATMENT OF FABRICS FOR GAS MANTLES.
APPLICATION FILED JUNE 14, 1921.

1,436,359.

Patented Nov. 21, 1922.
3 SHEETS—SHEET 2.

J. T. ROBIN.
TREATMENT OF FABRICS FOR GAS MANTLES.
APPLICATION FILED JUNE 14, 1921.
1,436,359.
Patented Nov. 21, 1922.
3 SHEETS—SHEET 3.
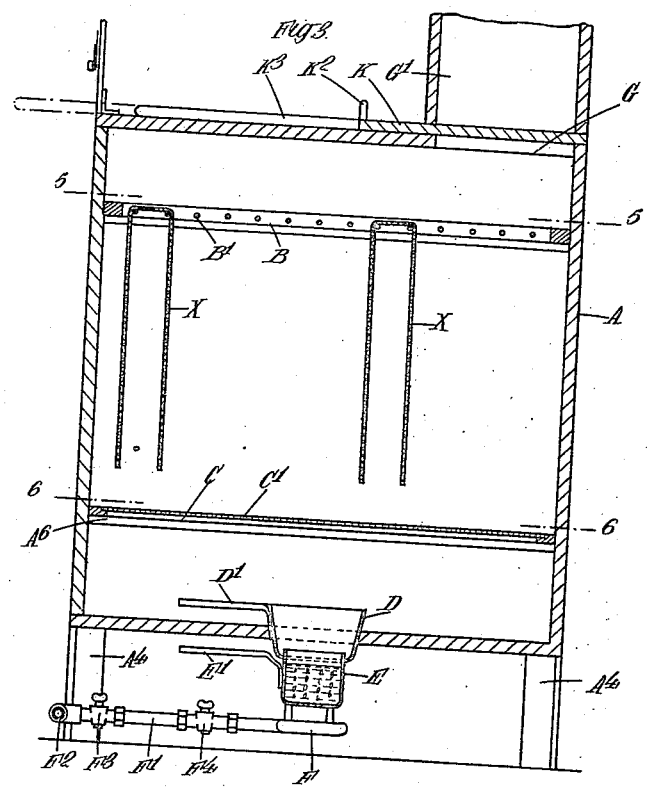
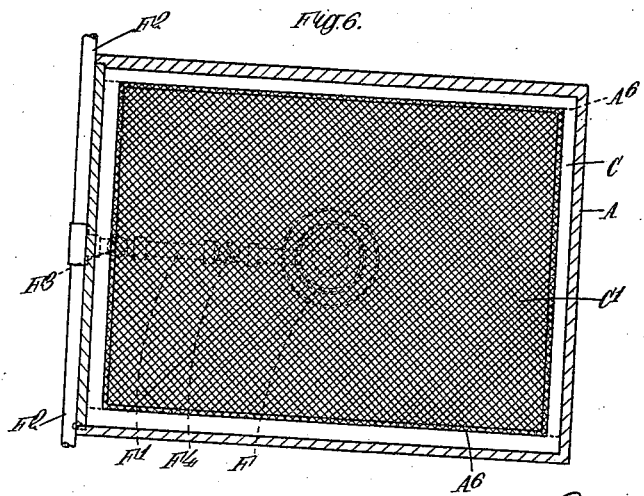

Patented Nov. 21, 1922.

1,436,359

UNITED STATES PATENT OFFICE.

JOSEPH THEODORE ROBIN, OF STREATHAM, LONDON, ENGLAND.

TREATMENT OF FABRICS FOR GAS MANTLES.

Application filed June 14, 1921. Serial No. 477,482.

*To all whom it may concern:*

Be it known that I, JOSEPH THEODORE ROBIN, a subject of the King of Great Britain, residing at "Woodmuir" 38, Tooting Bec Gardens, Streatham, in the county of London, England, have invented certain new and useful Improvements in or Relating to the Treatment of Fabrics for Gas Mantles, of which the following is a specification.
This invention relates to the treatment of fabrics, particularly those used in the manufacture of gas mantles, the chief object being to provide an improved process of and apparatus for de-nitrating the fabric which has been impregnated with a solution of thorium and cerium nitrates or similar compounds.

According to this invention the fabric impregnated with thorium and cerium nitrate solution after having been dried is subjected to the action of ammonia fumes produced by heating a solution of ammonia, the fumes being distributed uniformly over the fabric. This treatment is carried out until complete de-nitration is effected so as to leave the thorium and cerium impregnated or precipitated in the fabric. It will become apparent that by means of the present invention, it is possible to effect denitration of the dried impregnated fabric in an economical, rapid and efficient manner by heating a solution of ammonia contained in a vessel in direct communication with the chamber containing the dried impregnated fabric so that ammonia fumes are evolved freely within or practically within the said chamber. These fumes need not be "in vacuo", and are at once caused while in heated condition to completely surround and act on the fabric. The fabric is subsequently washed preferably in distilled water to remove excess deposit of ammonium nitrate which may collect on the fabric in the form of small crystals without removing the thorium and cerium compounds which are rendered insoluble in water by the previous treatment. Any excess deposit of ammonium nitrate which may collect on the fabric in the form of small crystals can be removed by washing the fabric preferably in distilled water. The apparatus employed for the purpose of this invention may comprise a cupboard or receptacle, the lower part of which contains or is in communication with a container in which the ammonia solution is heated preferably to boiling point so that the fumes are freely and readily given off. The hot ammonia fumes are distributed by means of a gauze screen of fine mesh over practically the whole area of the cupboard so as to completely surround and uniformly come into contact with the fabric which is preferably suspended on rails above the gauze screen; the fabric when used for the manufacture of gas mantles is in the form of stockings which may be suspended in close proximity on the aforesaid rails. The gauze screen and the rails are mounted in frames which can be readily inserted into or removed from the cupboard after the door of the latter has been opened. An opening in the upper part of the cupboard communicates with a flue which flue opening may be closed by a plate prior to and during the de-nitration process and after the process has been carried out the plate may be removed from the said opening so that by means of an electric fan the ammonia fumes can be drawn off prior to the opening of the cupboard door. Several of the aforesaid cupboards may be arranged in close proximity for example side by side and may be connected to a common flue. The process can be carried out in any one or more of the cupboards at different times as the cupboards are rendered independent by the plates which control the flue openings leading to the common flue.

In order that the said invention may be clearly understood and readily carried into effect the same will now be described more fully with reference to the accompanying diagrammatic drawings, in which:—

Figure 1 is a front view of one form of the improved apparatus showing for example three of the aforesaid cupboards arranged side by side and connected to a comon flue.

Figure 3 is a vertical section taken on the line 3—3 of Figure 2.

Figure 4 is a plan view of one of the cupboards.

Figure 5:
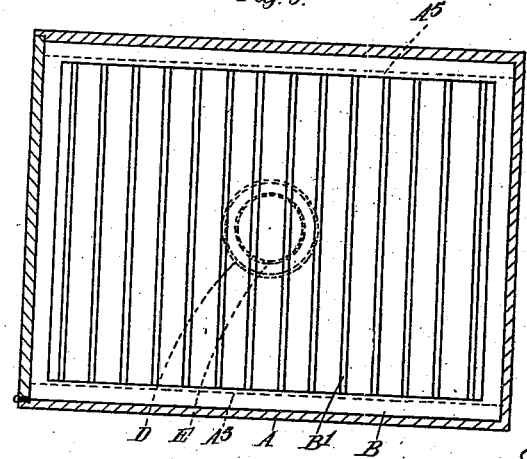

Figures 5 and 6 are sectional plan views taken on the lines 5—5 and 6—6 of Figure 3.

Figure 2:
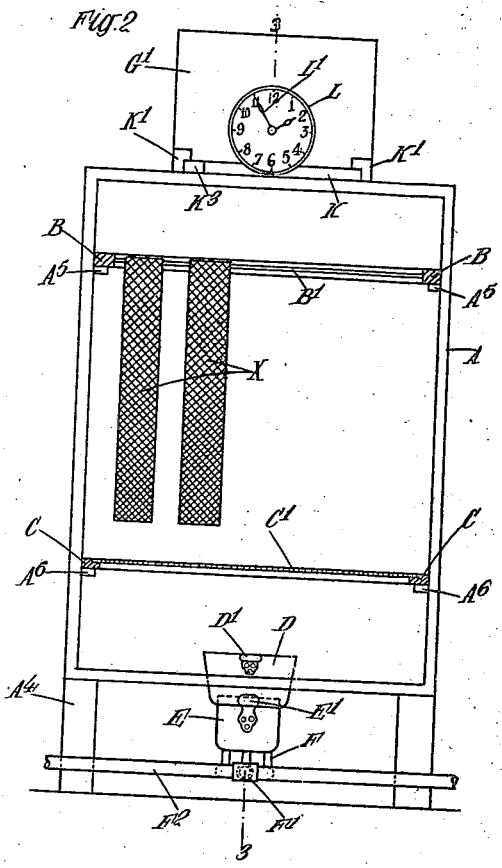
Figure 2 is a front view of one of the aforesaid cupboards with the door open showing the aforesaid suspending frame and the gauze screen frame section.

A represents the cupboards each of which is of rectangular shape and is as shown provided with a front door A′ hinged to one of the sides of the cupboard as shown in Figures 1 and 4. The interior of the cupboard is lined with sheet asbestos and the inner side of the door A is provided with a sheet asbestos covering. In the example shown each hinged door A' is maintained closed by means of short pivoted arms at the top and bottom of cupboard frame engaging with inclined surfaces on the door A' as indicated at $A^2$ in Figure 1. Additional closing means are provided in the form of transverse removable bars $A^3$ extending across the doors and fitting in brackets in which they may be screwed; by means of these closing means the door can be forced against its seating so as to produce a fairly air tight closure, the seating being preferably formed by rubber or other soft material. Any form of closing and fastening means may however be used. Each cupboard is supported a short distance above the ground floor level by supports $A^4$ to provide a space under the bottom of each cupboard. On the interior surfaces of the sides of each cupboard are secured two bars $A^5$ $A^5$ near the upper part and two bars $A^6$ $A^6$ near the lower part. The bars $A^5$ $A^5$ are adapted to receive and support a rectangular frame B carrying parallel aluminium rods B', which frame is capable of being slidably moved into and out of the cupboard when the door A' is open. The frame B is adapted to carry or support stockings X from which the gas mantles are made and which are suspended on the rails B as shown in Figures 2 and 3. The frame B carrying the stockings can be readily placed in the cupboard on the supporting bars $A^5$ $A^5$ ready for treatment and removed therefrom after treatment. A rectangular frame C carrying a gauze screen C' of fine mesh is adapted to be rested on the supporting bars $A^6$ $A^6$ at the lower part of the cupboard, this frame C also being capable of ready insertion into and removal from the cupboard. The bottom of the cupboard is formed with a centrally disposed hole which is adapted to receive a bottomless vessel D having a handle D' by means of which the vessel can be inserted into the cupboard and placed in the hole formed in the cupboard bottom. In the space below the bottom of the cupboard a vessel E having a handle E' is placed and supported on a gas burner F, this vessel E containing the solution of ammonia which is heated to boiling point to produce freely and readily the ammonia fumes. The vessel D is fitted around the upper part of the vessel E as shown in Figures 2 and 3 and serves as a kind of funnel or connecting tube between the exterior of the cupboard and the interior to conduct the fumes from the heated ammonia solution in the vessel E into the cupboard. The heated fumes enter the interior of the cupboard and are momentarily confined within the space between the cupboard bottom and the gauze screen C' which extends practically over the whole cross sectional area of the cupboard as shown in Figure 6. Thus the fumes confined in the space below the screen C' gradually penetrate through the whole surface of the screen and rise to the top of the cupboard thereby ensuring that the fumes surround and come into contact uniformly with the stockings suspended on the rails B' of the frame B. In the upper part of each cupboard an opening G is provided leading to a flue G' which is common to the several cupboards and is connected to a casing H (which may have hinged doors) containing an electrically driven fan H' see Figure 1 and communicating with a chimney. The opening G is adapted to be closed when the de-nitrating process is to be carried out by a plate or cover K slidably supported on the top of the cupboard K' the cover K having a handle portion $K^2$ by means of which the attendant may slidably move the plate towards the back of the cupboard to close the opening G (see Figure 3) or in the opposite direction to uncover the opening. At the front end of the cover K is a forwardly extending projection $K^3$ which when the cover is in the position to uncover the opening G extends a fair distance in front of the cupboard thus serving as an indicator by means of which the attendant can readily notice that the opening G is uncovered and can on closing the door A' when the process is to be carried out move the cover K to close the opening G. When the cover K is in the position to close the opening G and the door A' is closed, the cupboard is practically air-tight just sufficient leakage however being provided for example in the bottom of the cupboard around the vessel D to allow air in the cupboard to be expelled by entry of the ammonia fumes. The gas burners F pertaining to the several cupboards are connected by branch pipes F' to a main gas supply pipe $F^2$ extending along the lower part of the front of the apparatus as shown in Figure 1. Each branch pipe is provided with a cock $F^3$ by means of which gas is admitted to or shut off from the branch pipe F and with an additional cock $F^4$ which can be adjusted to regulate the amount of gas flowing to the burner when the cock $F^3$ is opened. At the upper part of the front of each cupboard is provided a dial plate L marked as an ordinary clock face and provided with two adjustable hands L' which can be moved and set in any desired position to indicate the time at which the treatment in that particular cupboard will be completed.

In carrying out the process the fabric after having been saturated in a solution of thorium nitrate containing a small percentage of cerium nitrate is weighed and afterwards a certain amount of the thorium nitrate solution is expressed preferably by treatment in a centrifugal machine in the usual manner. The fabric is then weighed to ascertain that the desired amount of the thorium and cerium nitrate solution remains absorbed by the fabric. The fabric is then dried preferably by the action of hot air in a suitable receptacle in the usual manner and after drying the stockings are suspended over the rods B' of the frame B which at that time is supported horizontally in any convenient manner outside the cupboard. The frame B carrying the stockings is then placed in any one of the cupboards on the bars $A^5$ $A^5$ and after placing the gauze in position on the bars $A^6$ $A^6$ and placing the vessels D and E as shown the door A' of that cupboard is closed and secured. The attendant then closes the opening G leading to the flue G' and the ammonia solution in the vessel E is then heated by igniting the gas at the burner F; the attendant then sets the hands of the dial pertaining to that particular cupboard to the time when the treatment will have effected a complete de-nitration of the stockings. The heated ammonia fumes after penetrating through the gauze screen act uniformly on all the stockings suspended above the screen and this treatment is carried out for a suitable period depending on the nature of the fabric under treatment; if the fabric under treatment be artificial silk, the treatment is carried out for about forty minutes; when the treatment has effected up to the time indicated by the hands L' on the clock dial L, the attendant moves the cover K to uncover the opening G and sets the electric fan H in operation and afterwards slightly opens the door A' so that the ammonia fumes are drawn from the cupboard and after the fumes have been removed the door A' is fully opened and the frame B carrying the de-nitrated stockings is removed, any excess of ammonia nitrate deposited on the stockings in the form of crystals or on the gauze screen can be removed by washing in distilled water. The hinged doors of the casing H are closed, during the drawing off of the ammonia fumes from any one or more of the cupboards but can be opened and the fan put into operation when it is desired to move any foul air from or freshen the air in the room in which the apparatus is situated. The treatment can be carried out in any number of the compartments at different times as the cupboards can be rendered quite independent and disconnected from the common flue G' by means of the covers K.

What I claim and desire to secure by Letters Patent of the United States is:—

1. A process of denitrating fabric impregnated with a solution of thorium and cerium nitrates, in which the fabric after being dried is placed in a container wherein ammonia fumes are subsequently produced by heating a solution of ammonia so that the fumes are evolved within or practically within the container and at once act on the fabric while they are in heated condition, substantially as described.

2. A process of denitrating fabric impregnated with a solution of thorium and cerium nitrates, in which the fabric after being dried is placed in a container wherein ammonia fumes are subsequently produced by heating a solution of ammonia so that the fumes are evolved within or practically within the container and at once act on the fabric while they are in heated condition, the ammonia fumes being distributed or spread so as to rapidly surround and uniformly come into contact with the fabric.

3. Apparatus for use in the denitration of fabric impregnated with a solution of thorium and cerium nitrates comprising a container in which the impregnated fabric is supported or suspended, means for heating a solution of ammonia to produce ammonia fumes and a gauze screen which distributes or spreads the ammonia fumes over the whole area of the container so as to completely surround and uniformly act on the impregnated fabric, substantially as described.

4. Apparatus for de-nitrating fabrics impregnated with a solution of thorium and cerium nitrates comprising a cupboard adapted to receive a frame carrying suspending rails for the fabric and a gauze screen fitted in the cupboard above a vessel containing a solution of ammonia and means for heating the ammonia solution to produce hot ammonia fumes which penetrate through the gauze screen and come into uniform contact with the suspended fabric.

5. Apparatus for de-nitrating fabrics impregnated with a solution of thorium and cerium nitrates comprising a cupboard having a door, a removable supporting frame on which the fabric is suspended, a gauze screen below the suspended fabric, a vessel disposed below the gauze screen containing a solution of ammonia, means for heating the said solution and means for controlling a flue opening through which the ammonia fumes are exhausted after the process has been carried out.

6. Apparatus for de-nitrating fabrics impregnated with a solution of thorium and cerium nitrates comprising a closed cupboard in which the fabric is suspended, a gauze distributing screen in said cupboard, a vessel containing a solution of ammonia with means for heating the latter outside said cupboard, a connecting tube communicating with the interior of said cupboard for directing the hot ammonia fumes to the interior of the cupboard whence they pass through the gauze distributing screen so as to come into contact with the said suspended fabric.

7. Apparatus for de-nitrating fabrics impregnated with a solution of thorium and cerium nitrates comprising a container, means for suspending the fabrics therein, a vessel containing ammonia solution, means for heating said solution to produce hot ammonia fumes, a gauze screen for distributing said fumes into uniform contact with said fabric, a flue leading from said container, a closing door for controlling an opening in said container leading to the flue and means associated with said door to readily indicate whether it is in the open or closed position.

8. Apparatus for use in the denitration of fabrics impregnated with a solution of thorium and cerium nitrates, comprising a chamber, means for suspending the fabrics in said chamber which at its bottom has an opening to receive a vessel containing ammonia solution, means for heating said ammonia solution to produce ammonia fumes, and a fume distributing device disposed in said chamber above said vessel and below the suspended fabric.

9. Apparatus for de-nitrating fabrics impregnated with a solution of thorium and cerium nitrates comprising a cupboard, a frame having supporting rails horizontally and detachably mounted in the upper part of said cupboard, a frame having a gauze screen horizontally and detachably mounted in the said cupboard below the fabric suspended on the aforesaid supporting rails, a vessel containing ammonia solution and associated with heating means under said cupboard, a connecting tube or sleeve surrounding said vessel and extending through an opening in the base of the cupboard, said tube being formed to permit of its being readily removed from or placed in the said opening, a flue opening in the top of said cupboard and a horizontal sliding door for controlling said flue opening and a forward projection on said door adapted to project beyond the front of the cupboard when the door is in the open position.

10. Apparatus for de-nitrating fabrics impregnated with a solution of thorium and cerium nitrates comprising a series of closed containers or cupboards raised from the floor, means for suspending the fabrics in each container, a gauze distributing screen in each container, a vessel for containing ammonia solution supported in the space below each container connected to said container under gauze screen, heating means associated with said vessel a common flue connected to said several containers which have independently operable doors for controlling openings leading to said common flue and a blower for drawing off ammonia fumes when said doors are opened.

JOSEPH THEODORE ROBIN.